United States Patent [19]
Dyer et al.

[11] Patent Number: 5,783,114
[45] Date of Patent: Jul. 21, 1998

[54] LIQUID CRYSTALLINE DISPLAY

[75] Inventors: Daniel John Dyer; Robert James Twieg, both of San Jose, Calif.

[73] Assignee: International Business Machines Corporation, Armonk, N.Y.

[21] Appl. No.: 753,841

[22] Filed: Dec. 2, 1996

[51] Int. Cl.[6] .................... C09K 19/34; C09K 19/52; F21V 9/00
[52] U.S. Cl. .............. 252/582; 252/299.01; 252/299.61
[58] Field of Search ............... 252/299.01, 299.61, 252/582

[56] References Cited

U.S. PATENT DOCUMENTS

| | | | |
|---|---|---|---|
| 4,105,299 | 8/1978 | Huffman et al. | 252/299.01 |
| 5,011,624 | 4/1991 | Yamagishi et al. | 252/299.5 |
| 5,068,052 | 11/1991 | Watanabe et al. | 252/299.01 |
| 5,116,528 | 5/1992 | Mullen et al. | 252/299.5 |
| 5,225,104 | 7/1993 | Van Steenkiste et al. | 252/299.01 |
| 5,240,636 | 8/1993 | Doane et al. | 252/299.01 |
| 5,304,323 | 4/1994 | Arai et al. | 252/299.5 |
| 5,315,419 | 5/1994 | Saupe et al. | 359/46 |
| 5,453,863 | 9/1995 | West et al. | 359/91 |

OTHER PUBLICATIONS

B. P. Besapalov et al., "Reaction of Y–Pyrones with 1,3–Bis-(Dicyanomethylene) Indan", Scientific–Research of Organic Intermediates and Dyes, Moscow. Translated from Khimiya Geterotsiklicheskikh Soedinenii, No. 5, pp. 603–608, May 1985. Original article submitted Jan. 19, 1984; revision submitted Oct. 2, 1984.

Salpetersaure–ester d. Polyamylosen. Jahrg. 58 (1925).

D. M. Walba et al., "High Performance Electroclinic Materials", Ferroelectrics, 1993, vol. 148, pp. 435–442.

*Primary Examiner*—C. H. Kelly
*Attorney, Agent, or Firm*—Robert B. Martin

[57] ABSTRACT

The present invention is a display comprising a light-modulating composition comprising liquid crystalline pyrimidines or pyridazines preferably admixed with other liquid crystalline materials disposed between a first and second electrode.

7 Claims, 1 Drawing Sheet

LIQUID CRYSTALLINE DISPLAY

FIELD OF THE INVENTION

The present invention relates to light-modulating liquid crystalline compounds and also to a liquid crystalline display device.

BACKGROUND OF THE INVENTION

Liquid crystals have been used in a wide variety of electro-optic display applications. These include, in particular, electro-optic light-modulating applications which require compact, energy-efficient, voltage-controlled light modulator, such as watch, calculator, and laptop computer displays. Their popularity is due to the conveniently thin, flat shape and the very low power required. In these devices, a thin layer of liquid crystal (usually nematic) is sandwiched between parallel cell walls, which have been treated to control the alignment of the liquid crystal director. When a potential difference is applied between the transparent electrodes, the resulting electric field causes a realignment of the liquid crystalline molecules and a change in the optical behavior of the material.

The twisted nematic display is commonly used for digital watches and other small displays. A reflective twisted nematic display generally comprises liquid crystalline material sandwiched between two transparent electrodes, (e.g., indium tin oxide electrodes). The electrodes are sandwiched between two polarizers. The surfaces of the electrodes are treated so that, in the absence of an electric field, the local liquid crystalline directors are all coplanar, but twist through 90°. Light entering the cell is polarized parallel to the directors at the top surface. The light polarization follows the twist in the directors as the light passes through the cell and then the light passes through the polarizer at the bottom. The light is then reflected by a mirror and reverses its path to emerge at the top surface. This area appears bright. In an area in which the electric field is turned on, the directors align with the field throughout most of the sample. The incident light beam's polarization is not rotated by the liquid crystal directors and the light is absorbed by the second polarizer. This area appears dark.

U.S. Pat. No. 5,315,419 discloses a display utilizing smectic liquid crystalline material. The display cell generally has the same structure as the twisted nematic display cell. The light entering the cell is polarized. Due to the birefringence of the liquid crystal, the component of light incident on the liquid crystal is decomposed into two components of different speeds which change the direction of polarization depending on the thickness of the liquid crystal material. The upstream polarizer is aligned so that the polarization direction of light incident on the liquid crystal is parallel or perpendicular to the molecular directors in a first of the two stable states. In the first state, the incident polarized light is transmitted without change of the polarization direction by the liquid crystal and consequently blocked by the downstream polarizer. Upon application of an electric pulse, the tilt angle of the liquid crystalline material is changed so that the light is rotated and transmitted through the second polarizer. Other types of smectic liquid crystalline devices are known to those skilled in the art such as thermally/electrically addressable displays such as disclosed in U.S. Pat. No. 4,552,441 by Dewey, the disclosure of which is incorporated herein by reference for all purposes.

It is often desired that liquid crystal materials exhibit high birefringence as measured by a large change in refractive index ($\Delta n$). It is also desired that liquid crystalline materials be stable with rapid, reversible switching by application of an electric field between a first and second liquid crystalline orientation.

In the past, an increase in birefringence has been obtained by modifying known conjugated liquid crystalline compounds to extend the conjugation. Although this modification often results in increased birefringence, it also generally decreases the stability of the molecule (especially photochemical stability) and often reduces its solubility in the liquid crystalline matrix.

There is still a desire in the industry for a liquid crystalline material which has a high birefringence and and is stable with rapid reversible phase switching.

It is therefore an object of the present invention to provide an improved liquid crystal material and display device.

Other objects and advantages will become apparent from the following disclosure.

SUMMARY OF THE INVENTION

The present invention relates to an electro optic device having light-modulating composition comprising a low molecular weight, light modulating, liquid crystalline material optionally admixed with other liquid crystalline materials and/or dispersed in a polymer matrix. Preferably the electro optic device is a display which provides information in a visual form. The liquid crystalline material is a unsaturated carbon/nitrogen heterocyclic compound selected from (i) substituted 4-methylene dihydropyridine (ii) substituted 4-methylene dihydro pyrimidine and (iii) substituted 4-methylene dihydro pyridazine. The liquid crystalline material of the present invention exhibits desirable light modulating properties such as birefringence and/or dichroism.

A more thorough disclosure of the present invention is presented in the detailed description which follows and the accompanying drawing.

DETAILED DESCRIPTION OF THE INVENTION

Figure 1:
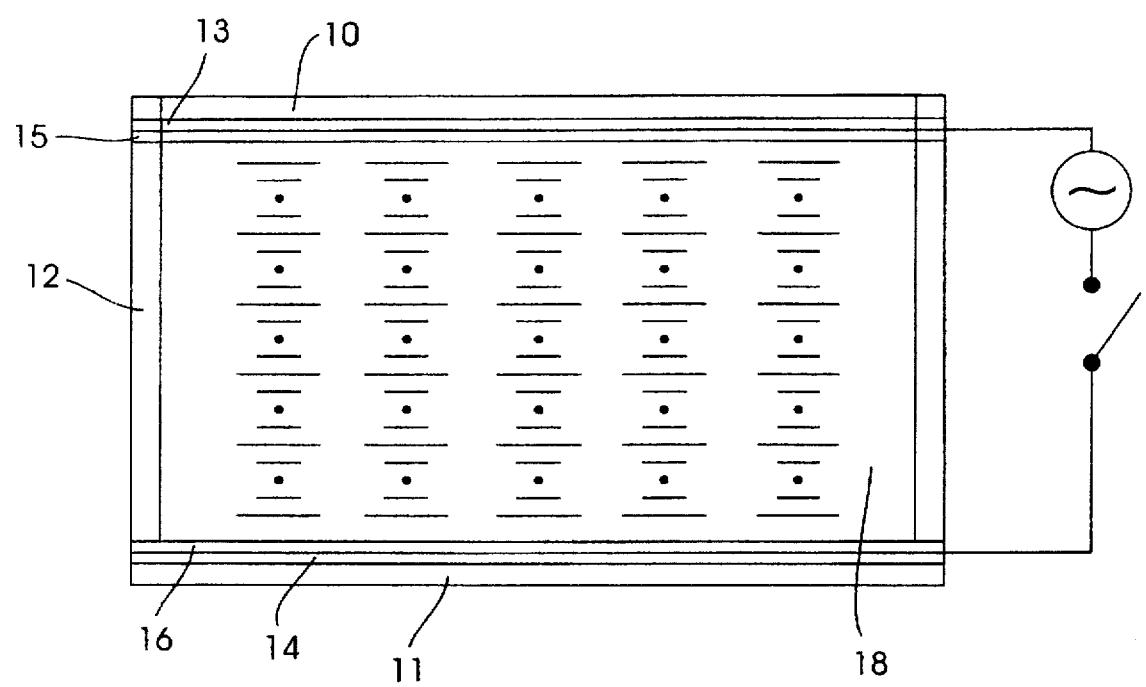
FIG. 1 is a cross-sectional view of an embodiment of the display device of the present invention.

The present invention relates to a display device having light-modulating composition comprising a low-molecular-weight light modulating material optionally dispersed in a polymer network.

The key feature of the present invention is the light modulating liquid crystalline material. The light modulating material is selected from a (i) substituted 4-methylene dihydropyridine (ii) a substituted 4-methylene dihydro pyrimidine or (iii) a substituted 4-methylene dihydro pyridazine.

As used herein 4-methylene dihydropyridine shall mean:

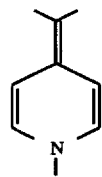

As used herein 4-methylene dihydropyrimidine shall mean:

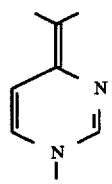

As used herein 4-methylene dihydropyridazine shall mean:

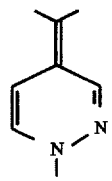

The heterocyclic compound has at least one electron acceptor substituent on the methylene group and a mesogenic substituent bonded to the nitrogen which is in the para position in respect to the methylene. As used herein, electron acceptor substituent shall mean a substituent which has a positive Hammett coefficient. Suitable electron acceptor substituents include cyano, nitro and $C_{1-20}$ alkylcarboxy (e.g., —$CO_2R$) substituents. The mesogenic substituent on the nitrogen is suitably aromatic or cycloaliphatic and promotes the formation and stabilization of the liquid crystalline phase. Optionally, the carbon positions on the heterocyclic ring can also be substituted with suitable substituents such as $C_{1-6}$ alkyl, alkoxy, haloalkyl (perfluoro) or halo substituent.

A preferred class of the compounds of the present invention have the following formula including isomers thereof:

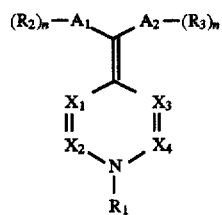

wherein $A_1$ is hydrido, $C_{1-8}$ alkyl or haloalkyl, aryl (e.g., benzyl, phenyl) or $A_2$; $A_2$ is cyano, nitro, $C_{1-6}$ alkylcarbonyl, sulfonyl, $C_{1-6}$ alkylsulfonyl, phenylsulfonyl, sulfinyl, $C_{1-6}$ alkylsulfinyl, aminocarboxy, or $C_{1-6}$ alkylcarboxy or $A_1$ and $A_2$ together are an electron acceptor ring substituent, e.g., 1,3 cyclo $C_{5-6}$ alkyldione, (1,3 cyclohexanedione or indanedione) or cyclo pentadiene; $X_1$, $X_2$, $X_3$ and $X_4$ are each independently C or N provide at least two of them are C, preferably three of them are C and more preferably all are C; $R_1$ $R_2$ and $R_3$ are each independently a $C_{1-30}$ mesogenic promoting group such as alkyl; alkoxy, alkyl phenyl, alkoxyphenyl; alkyl or alkoxycarbonylphenyl; alkyl or alkoxycarboxylphenyl, alkoxy or alkyl cyclohexyl; alkoxy or alkylphenyl azophenyl; alkoxy or alkylphenyl alkynyl phenyl and

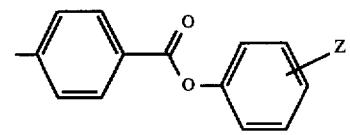
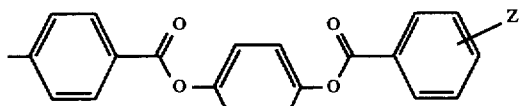
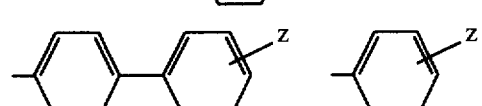
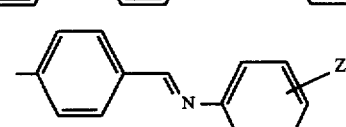
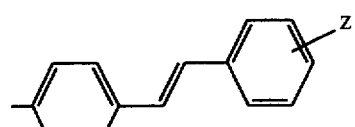
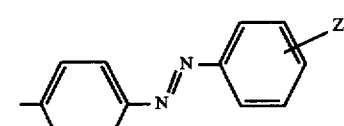
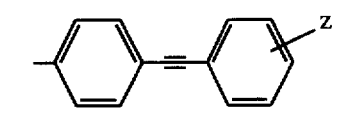
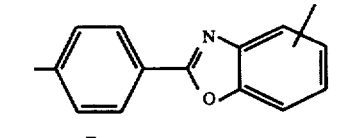
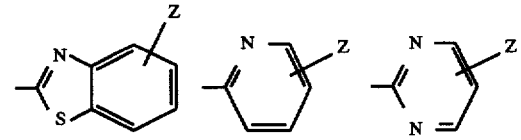

wherein n is 0 or 1 and Z is hydrido, cyano, nitro, $C_{1-20}$ alkyl, haloalkyl or alkoxy.

Other suitable mesogenic promoting groups will be known to those skilled in the art such as disclosed in Thermotropic Liquid Crystals, Vol. 22 of Critical Reports on Applied Chemistry, G. W. Gray, Editor, John Wiley and Sons (1987); Introduction to Liquid Crystals by Priestley et al. (1975); M. Schadt, Ber. Bunsenges Phys. Chem., 97, 1213 (1993), and D. Demus, H. Zaschke, Flussige Kristalle in Tabellen VEB Deutscher Verlag fur Grundstoffindustine Leipzig (1984), the disclosures of which are incorporated herein by reference.

A preferred class of compounds are compounds where $A_1$ and $A_2$ are preferably cyano or alkylcarboxy; and $R_1$ is phenyl, biphenyl or cyclohexyl. Preferred compounds are:

(a) 4-(4-(octyloxycarbonylcyanomethylene)4H-pyridin-1-yl)-benzoic acid decyl ester (b) 1-(4-n-hexylphenyl)-4-(octyloxycarbonylcyanomethylene)-1,4-dihydropyridine.

The heterocyclic compounds of the present invention can also be substituted by other substituents which do not unacceptably interfere with the mesogenic or optical properties of the molecule. Further, substituted methylene dihydrotriazines (e.g., 4-methylene-1,2,3-dihydrotriazine) and 10 membered nitrogen hetero fused bicyclic compounds such as 6-methylene dihydroisoquinoline and 7 methylene-dihydropteridine can also be used in the present invention and all of these compounds are contemplated as equivalent of those claimed herein.

The compounds can be made by aromatic nucleophilic substitution by reacting an activated mesogenic group with hydroxy pyridine to form a pyridone which is subsequently reacted with an activated methylene group. Suitable activated mesogenic reactants have halo or triflate substitutents.

The liquid crystalline material of the present invention may be dispersed in a polymer matrix. Suitable polymers include polyolefins such as polyethylene, polypropylene and polybutylene; polymers of acrylic acid, acrylic esters, acrylonitrile, etc.; vinyl halide polymers such as polyvinyl chloride, polyvinylidene chloride and polyvinylidene fluoride; vinyl polymers such as polystyrene and polyvinyl acetate; oxy polymers such as polyphenylene oxide, polyoxymethylene, and polyethylene oxide; polyamides such as nylon 6, nylon 66, nylon 610 and nylon 12; nitrogen-containing polymers such as polyurea, polyether imide, polyimide and polyamic acid; oxygen-containing and sulfur-containing polymers such as polysulfone, polyketone, polyether ketone, polyether ether ketone and polyphenylene sulfide; polyalkylene terephthalates such as polyethylene terephthalate, polypropylene terephthalate, and polybutylene terephthalate; polyesters such as polyacrylate, liquid crystal polyester and polycarbonate; and thermoplastic cellulose and thermoplastic urethanes. The polymer forming the matrix may optionally have mesogenic side chains such as the compounds of the present invention.

Preferably, other liquid crystalline materials are admixed with the heterocyclic compounds of the present invention. Suitable liquid crystalline materials include mixtures of nematic ($C_{1-6}$) alkyl substituted cyanobiphenyl and cyanoterphenyls doped with chiral agents. Chiral agents confer a finite pitch on nematic material. Suitable chiral agents are R1011 and CB15 marketed by Merck Industries. Other suitable liquid crystals include cyanophenylcyclohexanes, phenylpyrimidines, cyclohexylphenyl pyrimidines, alkylbenzoates, cyanobenzoates and mixtures of the foregoing. Specific examples of liquid crystal materials are S2, E7, E48, K24 and TM74A, all manufactured and sold by BDH Chemicals, Limited. Other examples include ROTN 132, 3010, S3033/1293, 3910, 3912, 403 and 607, all manufactured and sold by Hoffman La Roche Chemical Company. Also included are ZLI 1263, 1222 and 1905, manufactured and sold by E. Merck Chemical Company. Other suitable liquid crystalline materials for use in combination with the liquid crystalline material of the present invention will be known to those skilled in the art. The pitch length of the liquid crystalline material can be varied by varying the amount of chiral agent in the mixture.

Other additives can be added to the liquid crystalline mixture. These additives may be dispersants, surfactants, or other aids which improve the contrast, appearance or performance of the resulting light modulating material. Suitable dichroic or other dyes may also be added. Preferably, the dye will be substantially dissolved into the liquid crystal phase resulting in the light modulating material normally having a colored opaque appearance, which can be changed to a transparent or clear appearance by application of an electrical potential or temperature change. Examples of suitable dichroic dyes include anthraquinones D5 or D35 from BDH Chemicals, Ltd., and S3026 from Hoffman La Roche Chemical Company.

The liquid crystalline composition of the present invention will comprise about 5 to 50 weight % of the heterocyclic compound of the present invention and 50 to 95 weight % of other liquid crystalline materials, optionally dispersed in a polymer matrix.

Referring to FIG. 1, there is shown an embodiment of a liquid crystalline display device (cell) of the present invention comprising glass substrates 10 and 11 separated by spacers 12, each substrate having respectively, polarizers 13 and 14 (not required in other display embodiments) and transparent electrodes 15 and 16. Each electrode may have transparent alignment layers (not shown). Light modulating liquid crystalline composition 18 is disposed between alignment layers on the electrodes 15 and 16. The alignment layers (e.g., polyimide or nylon) facilitate proper alignment of the liquid crystalline composition. The alignment layers stabilize the liquid crystals in a planar orientation, where the director of the liquid crystal is parallel to the plane of the glass substrates. A reflective or absorbing layer (not shown) may be conveniently formed on the back of glass substrate 11.

Alternatively, the display can be provided with a backlight. Upon application of an electric field or thermal pulse the tilt angle of the smectic liquid crystalline material of the present invention is changed thereby changing the optical transmission properties of the material. The display device can be switched from light to dark state.

The composition of the present invention provides the display device with good performance in switching voltage and switching times. Other embodiments of displays are scattering or reflective such as disclosed in Yang et al., J. Appl. Phys. 1994, 76, p. 1331 and Doane et al., U.S. Pat. No. 5,437,811, the disclosures of which are incorporated herein by reference for all purposes.

Large area displays of the present invention can be fabricated with an active X-Y matrix addressing system having thin film transistors contiguous to each individual display cell.

The substituted 4 methylene heterocyclic compounds of the present invention can also be utilized as an electrooptic modulator (e.g., tunable optical filter and optical correlator) with applications in signal processing, color imaging and wave length multiplexing-demultiplexing in optical fiber communication. Suitable optical filters are disclosed in Optics Letters Vol. 15, No. 10 page 523 (May 15, 1990), and IEEE Photonics Technology Letters 7 379 (1995), the disclosures of which are incorporated herein by reference. Alternatively, the compounds of the present invention can be utilized as electro optic modulators for in plane switching as disclosed in Appl. Phys. Lett. 69 (5) p. 623 (Jul. 29, 1996) and Appl. Phys. Lett. 67 (26) 3895 (Dec. 25, 1995), the disclosures of which are incorporated herein by reference.

The following examples are a detailed description of certain compositions of the present invention. The detailed description falls within the scope of, and serves to exemplify, the more generally described compositions set forth above. The examples are presented for illustrative purposes only, and are not intended as a restriction on the scope of the invention.

EXAMPLE 1

Synthesis of Dihydropyridines

Representative Synthesis
4-(4-oxo-4H-pyridin-1-yl)benzoic acid ethyl ester

In a 500 ml round bottom flask with stirbar was place 4-fluorobenzoic acid ethyl ester (16.8 g, 100 mmol), 4-hydroxypyridine (14.26 g, 150 mmol), potassium carbonate (20.7 g, 150 mmol) and N-methylpyrrolidinone (75 ml). This mixture was gradually warmed to 140° C. and kept at this temperature for three hours after which time all the starting aryl fluoride was consumed. The mixture was cooled to room temperature and with stirring ice and water was added in porions to bring the volume up to 500 ml. The precipitated product was isolated by suction filtration, washed well with water and air dried. This directly isolated material was very pure and suitable for further use. Material recrystallized from toluene had Mp 178°–180°.

The general method for conversion of 4-hydroxypyridine to an N-arylpyridone by aromatic nucleophilic substitution is given by A. F. Vompe, N. F. Turisyna, I. L Levkoev, Doklady. Akad. Nauk S.S.S.R., 65, 839 (1949); CA436626g.

4-(4-oxo-4H-pyridin-1-yl)benzoic acid

A mixture of 4-(4-oxo-4H-pyridin-1-yl)benzoic acid ethyl ester (10.0 gm, 41.1 mmol), potassium hydroxide (6.92 g, 123 mmol) and methanol (250 ml) was stirred overnight at room temperature. The mixture was acidified by dropwise addition of concentrated hydrochloric acid and the precipitate was collected by suction filtration to give the product as a white powder (9.08 g).

4-(4(octyloxycarbonylcyanomethylene)-4H-pyridin-1-yl) benzoic acid

A mixture of 4-(4-oxo-4H-pyridin-1-yl)benzoic acid (814 mg, 3.5 mmol), octylcyanoacetate (3.44 g, 17.5 mmol) and acetic anhydride (45 ml) was heated at 130° C. for 3 hours. More octylcyanoacetate (3.44 g, 17.5 mmol) was added and the mixture heated for 3 hours more. The mixture was then filtered hot, and the filtrate was diluted with acetic acid (15 ml) and water (15 ml). Upon standing overnight in the refrigerator the product crystallized out and was isolated by suction filtration as a yellow solid (1.16 g, 85%).

This method for condensation of a y-pyridone with an active methylene compound follows from the same reaction described on a y-pyrone or y-thiapyrone; I. Belsky, H. Dodiuk, Y. Shvo, J. Org. Chem., 39, 989 (1974).

4-(4-(octyloxycarbonylcyanomethylene)-4H-pyridin-1-yl) benzoic acid decyl ester

A mixture of 4-(4-octyloxycarbonlcyanomethylene)-4H-pyridine-1yl)benzoic acid (395 mg, 1.0 mmol), iododecane (1.07 g, 4.0 mmol), anhydrous potassium carbonate (691 mg, 5 mmol) and N-methylpyrollidinone (NMP) was stirred and heated under nitrogen for 3 hours at 70° C. The mixture was then cooled and the product precipitated by the addition of 1:1 methanol/water, isolated by suction filtration and washed with the same mixture. The product, 442 mg (83%) as a yellow solid was found to be pure by NMR.

4-(4-oxo-4H-pyridin-1-yl)hexylbenzene

In a 200 ml pear flask with stirbar, reflux condenser and nitrogen bubbler was placed chelidonic acid monohydrate (5.05 g, 25 mmol) tech 90% 4-hexylaniline (4.8 g, 27.7 mmol) and methyl sulfoxide (25 ml). This mixture is gradually heated up in an oil bath and at 100° C. decarboxylation commences and the temperature is finally raised to a maximum of 145° and sustained for one hour during which time decarboxylation ceases. The mixture was then cooled in an ice bath and water added (150 ml) to give a black tarry precipitate. The water was decanted from this black tar which was washed with more ice water and then taken up in ethyl acetate. The ethyl acetate solution was dried with magnesium sulfate and chromatographed on a short column of silica gel. Elution with ethyl acetate removed some unreacted hexylaniline and other impurities and gradual addition of methanol (up to 5%) to the eluent removed the desired product. Fractions containing the product were combined and concentrated to a dark viscous oil (4.0 g, 63%) which gradually crystallized on standing under vacuum. The material was very dark due to a trace of coeluting dye but was found to be quite pure by NMR and suitable for further use.

The general method using chelidonic acid which was applied to the synthesis of this compound is found in A. Katritzky, R. Murugan, K Sakizadeh, J. Heterocyclic. Chem., 21, 1465 (1984).

1-(4-n-hexylphenyl)-4-(octyloxycarbonylcyanomethylene)-1,4-dihydropyridine

In a 50 ml round bottom flask with stirbar, reflux condenser and nitrogen bubbler was placed the 4-(4-oxo-4Hpyridin-1-yl)hexylbenzene (0.638 g, 2.5 mmol), octylcyanoacetate (1.97 g, 10 mmol) and acetic anhydride (5.0 g). This mixture was heated in a 140° C. oil bath for 4.0 hours. After this period the mixture was cooled and crystalline product was isolated by suction filtration and washed well with acetic anhydride. The crude product was crystallized once from 1-propanol as yellow crystals (0.90 g, 83%).

Characterization of Liquid Crystal Phases

Compounds were purified by chromatography and/or recrystallization and thermotropic liquid crystal behavior was evaluated by polarized optical microscopy and differential scanning calorimetry (DSC).

In the case of polarized optical microscopy analysis, a few milligrams of sample was placed on a microscope slide and covered with a glass cover slip. No surface treatment or cleaning was performed on either the glass slide or cover slip. The microscope was an Olympus BH-2 equipped with variable polarizers and samples were usually observed at a magnification of 100×500×.

Sample temperature was controlled by a Mettler FP5 controller and FP52 hotstage. The sample was first quickly heated (>10°/min) to identify the approximate location of any phase transitions. A new sample was then heated at a slower rate (<2°/min) near any melting and clearing events. In the cases where no thermotropic liquid crystal phase(s) were found on heating the sample was also cooled down slowly (<2°/min) to look for any monotropic phases.

Whenever possible the liquid crystal phases were classified by evaluation of their characteristic textures (D. Dennis and L. Richter, "Textures of Liquid Crystals", Velag Chemie, 1978; G. W. Gray, J. W. G. Goodby, "Smectic Liquid Crytals, Textures and Structures", Leonard Hill, 1984). These new liquid crystalline compounds appear to possess almost exclusively $S_A$ (or chiral $S_A$*) phases as assigned from their textures. Phase transitions obtained by microscopy are reported in the tables using standard conventions as found in D. Demus and H. Zaschke, "Flussige Kristalle in Tabellen II", VEB Deutscher Verlag fur Grundstoffindustrie, Leipzig, 1984. Here the phases are assigned with letter (K, crystal; S, smectic; N, nematic; I, isotropic; etc.), transition markers ("•" if the phase exists and "-" if it is not present) and "*" indicates the material is chiral.

In the case of differential scanning calorimetry, 5–10 mg of the sample was sealed in an aluminum pan and evaluated by the following protocol: First the sample was heated at 10°/min to 20° above the clearing temperature. Second, the temperature was then lowered at the same rate back to a temperature at or lower than at which crystallization occurs. Third, the sample was then heated once again at 10°/min to 20° above the clearing point to see if the same transitions are found.

Samples are also studied by thermal gravitimetric analysis (TGA) as an evaluation of both volatility and thermal stability Here samples are heated at 20°/min between ambient and 550° C.

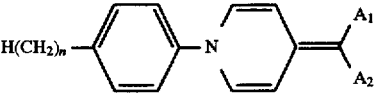

| n | $A_1$ | $A_2$ | K | | S | | I |
|---|----|----|---|---|---|---|---|
| 6 | CN | CN | . | 142, 172 | — | | . |
| 6 | CN | $CO_2(CH_2)_2H$ | . | 145 | . | 171 | . |
| 6 | CN | $CO_2(CH_2)_8H$ | . | 142 | . | 178 | . |

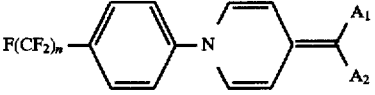

| n | $A_1$ | $A_2$ | K | | S | | I |
|---|----|----|---|---|---|---|---|
| 6 | CN | CN | . | 186 | . | 244 | . |
| 6 | CN | $CO_2(CH_2)_2H$ | . | 242 | . | >300 | . |
| 6 | CN | $CO_2(CH_2)_8H$ | . | 177 | . | 235 | . |

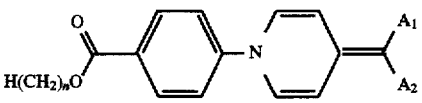

| n | $A_1$ | $A_2$ | K | | S | | I |
|---|----|----|---|---|---|---|---|
| 2 | CN | $CO_2(CH_2)_2H$ | . | 252 | — | | . |
| 2 | CN | $CO_2(CH_2)_8H$ | . | 285 | . | >300 | . |
| 10 | CN | CN | . | 226 | — | | . |
| 10 | CN | $CO_2(CH_2)_8H$ | . | 145 | . | 184 | . |

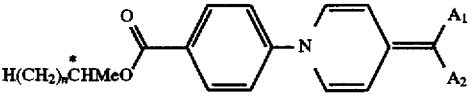

| n | $A_1$ | $A_2$ | K | | S | | I |
|---|----|----|---|---|---|---|---|
| 6 | CN | CN | . | 200 | — | | . |
| 7 | CN | $CO_2(CH_2)_8H$ | . | 103 | . | 132 | . |

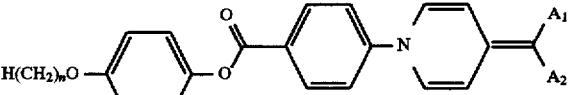

| n | $A_1$ | $A_2$ | K | | S | | I |
|---|----|----|---|---|---|---|---|
| 8 | CN | $CO_2(CH_2)_8H$ | . | 169 | . | 272 | . |

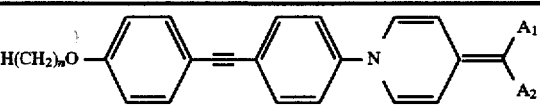

| n | $A_1$ | $A_2$ | K | | S | | I |
|---|----|----|---|---|---|---|---|
| 10 | CN | CN | . | 163, 189 | . | 262 | . |
| 10 | CN | $CO_2(CH_2)_2H$ | . | 188 | . | 284 | . |
| 10 | CN | $CO_2(CH_2)_8H$ | . | 149 | . | 279 | . |

-continued

| n | $A_1$ | $A_2$ | K | S | I |
|---|---|---|---|---|---|
| 10 | CN | CN | . 189 | . | 250 . |
| 10 | CN | $CO_2(CH_2)_2H$ | . 174 | . | 299 . |
| 10 | CN | $CO_2(CH_2)_8H$ | . 145 | . | 288 . |
| 10 | CN | COPh | . 185 | . | >300 . |
| 12 | CN | CN | . 190 | . | 273 . |
| 12 | CN | $CO_2(CH_2)_2H$ | . 166 | . | 300 . |
| 12 | CN | $CO_2(CH_2)_8H$ | . 142 | . | 288 . |
| 12 | CN | COPh | . 200 | . | >300 . |
| 12 | CN | $SO_2CH_3$ | . 148 | . | 237 . |

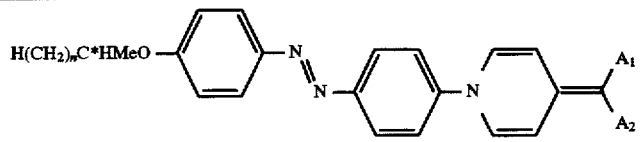

| n | $A_1$ | $A_2$ | K | S | I |
|---|---|---|---|---|---|
| 6 | CN | CN | . 195 | — | . |
| 6 | CN | $CO_2(CH_2)_2H$ | . 142 | . | 248 . |
| 6 | CN | $CO_2(CH_2)_8H$ | . 184 | . | 245 . |
| 6 | CN | COPh | . 207 | . | >300 . |

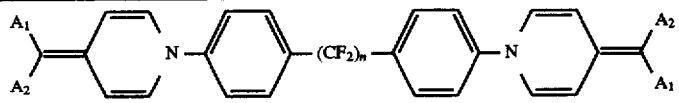

| n | $A_1$ | $A_2$ | K | S | I |
|---|---|---|---|---|---|
| 6 | CN | $CO_2(CH_2)_8H$ | . 270 | . | 297 . |

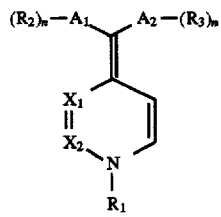

| n | $A_1$ | $A_2$ | K | S | I |
|---|---|---|---|---|---|
| — | CN | $CO_2(CH_2)_8H$ | . 243 | . | 253 . |

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

What is claimed is:

1. An electro optic device comprising a light-modulating composition disposed between a first and second electrode, the composition comprising light-modulating heterocyclic compound having the formula:

$$(R_2)_n-A_1\diagdown\;\;A_2-(R_3)_n$$
(structure with $X_1$, $X_2$, N, $R_1$)

wherein $A_1$ is hydrido, $C_{1-8}$ alkyl or haloalkyl, benzyl or phenyl or $A_2$; $A_2$ is cyano, nitro, $C_{1-6}$ alkylcarbonyl, sulfonyl, $C_{1-6}$ alkylsulfonyl, phenylsulfonyl, sulfinyl, $C_{1-6}$ alkylsulfinyl, aminocarboxy, or $C_{1-6}$ alkylcarboxy or $A_1$ and $A_2$ together are 1,3 cyclo $C_{5-6}$ alkyldione, or cyclo pentadiene; $X_1$, and $X_2$, are each independently C or N provide at least one of them is N, $R_1$, $R_2$ and $R_3$ are each independently a $C_{1-30}$ mesogenic group and n is 0 or 1.

2. The electro optic device of claim 1 wherein the device is a display.

3. The display of claim 2 wherein the mesogenic group is selected from alkyl or alkoxy carbonylphenyl; alkyl or alkoxy carboxylphenyl; alkyl or alkoxy cyclohexyl; alkyl or alkoxy phenyl azophenyl; and alkyl or alkoxy phenyl alkynyl phenyl.

4. The display of claim 3 wherein the composition further comprises a second liquid crystalline material.

5. The display of claim 4 wherein the second liquid crystalline material is selected from cyanobiphenyl, cyanoterphenyl or phenylbenzoate.

6. The display of claim 4 wherein the composition further comprises a polymer.

7. The display of claim 6 wherein the polymer is a polyacrylate or polymethacrylate.

* * * * *

UNITED STATES PATENT AND TRADEMARK OFFICE
CERTIFICATE OF CORRRECTION

PATENT NO. : 5,783,114
DATED : July 21, 1998
INVENTOR(S) : Daniel J. Dyer, et al.

It is certified that error appears in the above-identified patent and that said Letters Patent is hereby corrected as shown below:

On the title page, item [56] add the following:

OTHER DOCUMENTS

| | |
|---|---|
| | R. Dabrowski et al., "Liquid-Crystalline 4-(trans-4'-n-Alkylycyclohexyl) Benzoates. The Effect of Terminal and Lateral Substituents on the Mesomorphic, Thermodynamic and Dielectric Properties, Mol. Cryst. Liq. Cryst., 1984, Vol. 107, pp. 411-443. |
| | C. Lin et al., "Side Chain Liquid Crystalline Ionic Polysiloxanes", Mol. Cryst. Liq. Cryst. Sci. Tech. Sect. A, 258, pp. 173-183 (1995). |

Signed and Sealed this

Sixth Day of April, 1999

*Attest:*

Q. TODD DICKINSON

*Attesting Officer*     *Acting Commissioner of Patents and Trademarks*